US011269610B1

(12) United States Patent
Nguyen

(10) Patent No.: US 11,269,610 B1
(45) Date of Patent: Mar. 8, 2022

(54) SYSTEM AND METHOD FOR SELF-SERVICE CONFIGURATION MANAGEMENT

(71) Applicant: JPMorgan Chase Bank, N.A., Ny, NY (US)

(72) Inventor: Hai Van Nguyen, Houston, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 15/662,937

(22) Filed: Jul. 28, 2017

Related U.S. Application Data

(60) Provisional application No. 62/375,220, filed on Aug. 15, 2016.

(51) Int. Cl.
  *G06F 8/65* (2018.01)
  *H04L 29/08* (2006.01)
  *H04L 67/10* (2022.01)

(52) U.S. Cl.
  CPC .............. *G06F 8/65* (2013.01); *H04L 67/10* (2013.01)

(58) Field of Classification Search
  CPC ..... G06F 8/71; G06F 8/64; G06F 8/65; G06F 8/654; G06F 8/656; G06F 8/658; G06F 8/66; G06F 8/70; G06F 9/44505; G06F 9/4451; G06F 8/60–66; H04L 67/10
  See application file for complete search history.

(56) References Cited

U.S. PATENT DOCUMENTS

| 6,282,711 B1 * | 8/2001 | Halpern | G06F 8/61 709/203 |
| 6,493,871 B1 * | 12/2002 | McGuire | G06F 8/65 717/169 |
| 7,171,458 B2 * | 1/2007 | Brown | G06F 9/44505 370/254 |
| 7,735,057 B2 * | 6/2010 | Rachman | G06F 8/658 717/100 |
| 8,060,585 B2 * | 11/2011 | Waud | G06F 8/656 709/221 |

(Continued)

OTHER PUBLICATIONS

U.S. Appl. No. 60/784,949 It Automation Appliance Having Scripting Functionality Martin Kacin, David Kloba, Michael R. Gray, Bill Clagett, and Matthew Lewinski Publicly available as of publication of US 2007/0226259 A1 (Year: 2007).*

(Continued)

*Primary Examiner* — Emerson C Puente
*Assistant Examiner* — Paul V Mills
(74) *Attorney, Agent, or Firm* — Greenblum & Bernstein, P.L.C.

(57) ABSTRACT

Embodiments of the present invention may provide systems and methods for self-service configuration management of applications across multiple deployments units, such as computers, servers, and the like. The applications may include software applications, application streams, virtual applications, sandbox applications, and the like. Embodiments of the present invention may create various configuration payloads (e.g., executables) dynamically and in real-time for client machine(s) based on selected configuration changes from a service portal, rather than having each configuration payload being packaged separately and individually by a packager.

22 Claims, 6 Drawing Sheets

(56) References Cited

U.S. PATENT DOCUMENTS

| | | | | |
|---|---|---|---|---|
| 2002/0188701 A1* | 12/2002 | Brown | ................ | G06F 9/44505 709/220 |
| 2004/0044999 A1* | 3/2004 | Gibson | .................... | G06F 8/65 717/178 |
| 2004/0230971 A1* | 11/2004 | Rachman | ................ | G06F 8/658 717/175 |
| 2006/0026589 A1* | 2/2006 | Schneider | ................ | G06F 8/60 717/174 |
| 2007/0226259 A1* | 9/2007 | Kacin | ....................... | G06F 8/60 |
| 2009/0119499 A1* | 5/2009 | Cao | ....................... | H04L 63/145 713/2 |
| 2009/0119660 A1* | 5/2009 | Redpath | .................... | G06F 8/61 717/175 |
| 2009/0198801 A1* | 8/2009 | Waud | ....................... | G06F 8/656 709/221 |
| 2014/0007075 A1* | 1/2014 | Sporkert | ................ | G06F 8/658 717/173 |

OTHER PUBLICATIONS

Dell Kace K1000 Systems Management Appliance Administrator Guide 6.4 Dell inc Chapters 4, 5, Appendix B (Year: 2015).*
A Remote System Update Mechanization (RSUM) Evan Glick (Year: 2010).*
Real World Software Configuration Management Sean Kenefick Chapter 10 (Year: 2003).*

* cited by examiner

SYSTEM AND METHOD FOR SELF-SERVICE CONFIGURATION MANAGEMENT

RELATED APPLICATION

This application claims priority to U.S. Provisional Application No. 62/375,220 filed Aug. 15, 2016, entitled "System and Method for Self-Configuration Management," the contents of which is incorporated herein.

FIELD OF THE INVENTION

Embodiments of the present invention are generally related to systems and methods for self-service configuration management.

BACKGROUND OF THE INVENTION

Computer networks generally include servers and workstations that run applications. Before applications can be run, the applications must first be installed and configured. Each physical machine typically stores a local install database for each application. In many cases, an application can have several configuration options, and the installer must choose which configuration options best suit the particular installation. In a large computer network environment, this process may have to be performed on thousands of servers and/or workstations.

One conventional approach to managing such a large project is called packaging. In this approach, some parts of the installation may be automated by developing a script or modifying an installer script. This way, much of the initial installation and configuration can be automated, without the need for user intervention. Packaging suffers from some serious drawbacks, however. One drawback is that packaging automates only the initial installation; it does not account for subsequent changes or updates to the application. For example, as time goes by, an application may need to be changed for a variety of reasons. To effectuate the change and deploy the change on multiple servers, another script must then be developed, which is a time-consuming and costly activity. To create the new script, the installer must have deep knowledge of the application or must take the time to learn about the application, wasting valuable resources.

Therefore, the inventor recognized a need in the art for self-service configuration management system that does not suffer from the drawbacks of conventional approaches described above.

SUMMARY OF THE INVENTION

Embodiments of the present invention may provide a self-service configuration management system, which may include a database, stored at a central location, to store configuration items of at least one application that is installed on multiple machines. The system may also include a web interface to receive, from a user, configuration selections representing changes to the at least one application. The system may further include a processor to automatically generate an executable based on the selected configuration items by the user, wherein the executable is transmitted to the multiple machines and causes the machines to change the applications based on the configuration selections.

Embodiments of the present invention may provide a method for self-service configuration. The method may include storing, at a central location, configuration items of at least one application installed on a plurality of machines, and receiving selections for changing the values of the configuration items from the user via a portal. Based on the user selections, the method may automatically generating an executable to deploy the changes for the at least one application on the plurality of machines.

Embodiments of the present invention may provide a non-transitory computer readable storage medium having stored thereon computer instructions for causing a computer to perform steps for self-service configuration. The steps may include storing, at a central location, configuration items of at least one application installed on a plurality of machines, and receiving selections for changing the values of the configuration items from the user via a portal. Based on the user selections, an executable may be automatically generated to deploy the changes for the at least one application on the plurality of machines.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of the present invention may provide systems and methods for self-service configuration management of applications across multiple deployments units, such as computers, servers, and the like. The applications may include software applications, application streams, virtual applications, sandbox applications, and the like. Embodiments of the present invention may create various configuration payloads (e.g., executables) dynamically and in real-time for client machine(s) based on selected configuration changes from a service portal, rather than having each configuration payload being packaged separately and individually by a packager.

Figure 1:
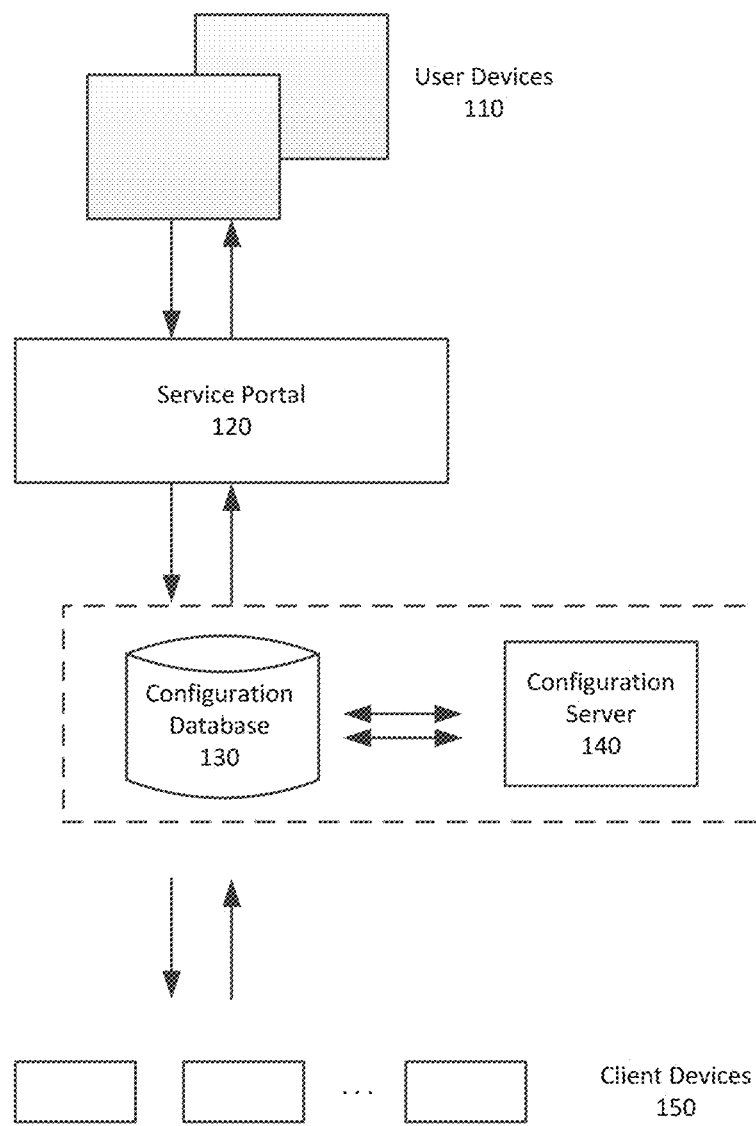
FIG. 1 is a block diagram illustrating an operating environment for operation of a self-service configuration management system in accordance with an embodiment of the present invention.

FIG. 1 is a block diagram illustrating an operating environment for operation of a self-service configuration management system in accordance with an embodiment of the present invention. The self-service configuration management system may include a plurality of user devices 110, a service portal 120, a configuration database 130, a configuration server 140, and a plurality of client devices 150.

The user devices 110 may be provided as a computing device such as a computer, laptop, tablet, etc. The user devices 110 may also be provided as mobile devices including, but not limited to, mobile smartphones, such as Android® phones and iPhones®, tablets, or hand-held wireless devices such as PDAs, multiprocessor systems, microprocessor-based or programmable consumer electronics, minicomputers, other handheld devices that may now be available or may in the future become available. These user devices 110 may provide access to the service portal 120 to different users such as a solutions owner, a requester, a developer, or an integrator.

The service portal 120 may be provided as a website, a mobile application, web API, or any other known technique known in the art. The service portal 120 may allow a user to select configuration items and make modifications to the configuration items, as described. The user devices 110 may be communicatively connected to the service portal 120 via a communication link. The communication link may be provided by one or more networks, such as the Internet. The network may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths. The service portal 120 may present configuration options for the application to a user. The service portal 120 may interact with the plurality of user devices 110, and may manage delivery of configuration information in accordance with embodiments of the present invention as described below.

The service portal 120 may also be communicatively connected to the configuration system, including the configuration database 130 and configuration server 140. The service portal 120 may communicate with the configuration database 130 and/or configuration server 140 via an application program interface (API). In an embodiment, the configuration database 130 and configuration server may be integrated together.

The configuration database 130 may store configuration items. The configuration database 130 may be provided in a central location in a network, rather than on each physical machine in the network. The configuration items may include registry values, file base changes, etc. The configuration items may also include upper and lower value limits for the items.

In an embodiment, the configuration database 130 may be provided as a SQL database. Data stored in the configuration database 130 may be in a lightweight secure format and may also be encrypted. The configuration database 130 may be compatible with other systems such as windows installer database structure. The configuration database 130 may be a universal database for the network and may store configuration items for a plurality of applications. The configuration items may be created using an application builder API. The configuration items may include registry information, file based changes, environmental entries, service entries, power shell codes, other types of codes to perform tasks, etc. An embodiment of database schema for the configuration database 130 is described below with reference to FIG. 4.

The configuration system, including the configuration database 130 and configuration server 140, may be communicatively connected to client devices 150. The client devices 150 may receive configuration files from the configuration system, including the configuration database 130 and configuration server 140, and may update applications thereon accordingly. The client devices 150 may be provided as a computing device such as a server, computer, laptop, tablet, etc.

Figure 2:
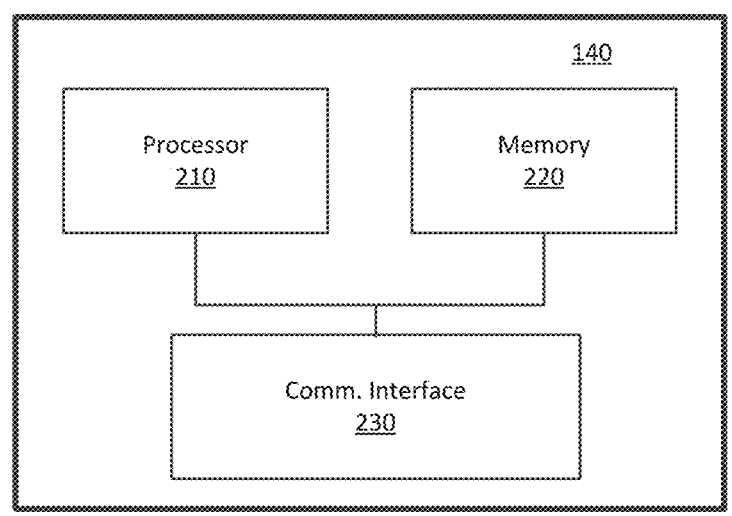
FIG. 2 is a block diagram of a configuration server in accordance with an embodiment of the present invention.

FIG. 2 illustrates the configuration server 140 in accordance with an embodiment of the present invention. The configuration server 140 may include a processor 210, memory 220, and a communication interface 230 The memory 220 may include a configuration program connected with a storage element. The processor 210 may execute various algorithms from the configuration program as will be further described below. The memory 220 may store data used by the configuration program. This data may be structured, semi-structured, or unstructured. The data storage areas in the memory 220 may include file systems and databases for storing large amounts of data. Data stored in the memory 220 may be managed and communicated with an Object-Relational Database Management System, as known in the art. The memory 220 may include multiple data storage areas, which may have different structures and store different types of data. For example, unstructured data may be stored separately from cleansed and structured data.

The communication interface 230 may be used for communicating with the client devices 150 and other devices over a network. In an embodiment, the configuration server 140 may also include a user interface to allow viewing and direct input.

Figure 3:
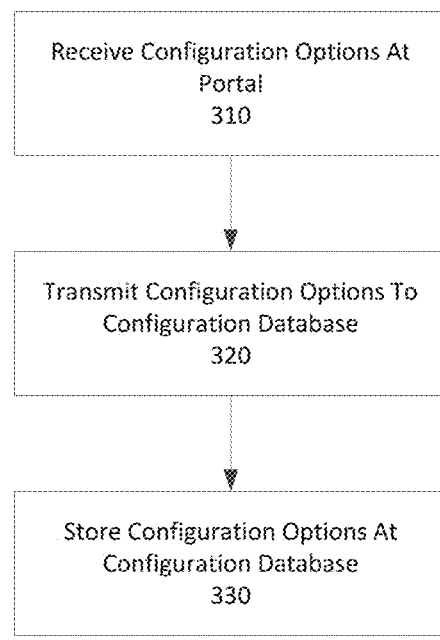
FIG. 3 is a flow diagram illustrating a method for initializing configuration options in accordance with an embodiment of the present invention.

FIG. 3 illustrates a flow diagram of a method 300 to initialize configuration options of an application according to an embodiment of the present invention. The method 300 may, for example, be performed by the configuration database 130 and configuration server 140 of FIG. 1 in an embodiment. In step 310, configuration options may be received at a service portal from a user. For example, a solutions owner, a requester, a developer, or an integrator may select configuration options at the service portal using a user device. In step 320, the selected configuration options may be transmitted to the configuration database. In step 330, the selected configuration options may be stored in the configuration database. The configuration database may store the configuration options in such a manner that subsequent payloads of different combination of configuration options may be dynamically assembled.

For example, in an embodiment of the present invention, application configuration packages may be created by a builder API based on the selected configuration options from the portal. The builder API may create package files (e.g., CAB, XML files) containing the package instructions for automated creation of installation files (e.g., Microsoft Service Installer (MSI), Microsoft Service Patch (MSP)). The package configuration may be stored in the configuration database.

In an embodiment of the present invention, the configuration database may store and host all application configuration data for identified applications. The configuration database may leverage SQL server file tables, which allows files to be stored within SQL tables and accessible through configuration framework API. Sensitive information may be encrypted within the configuration database, and encrypted data may only be decrypted by the configuration framework API.

Figure 4:
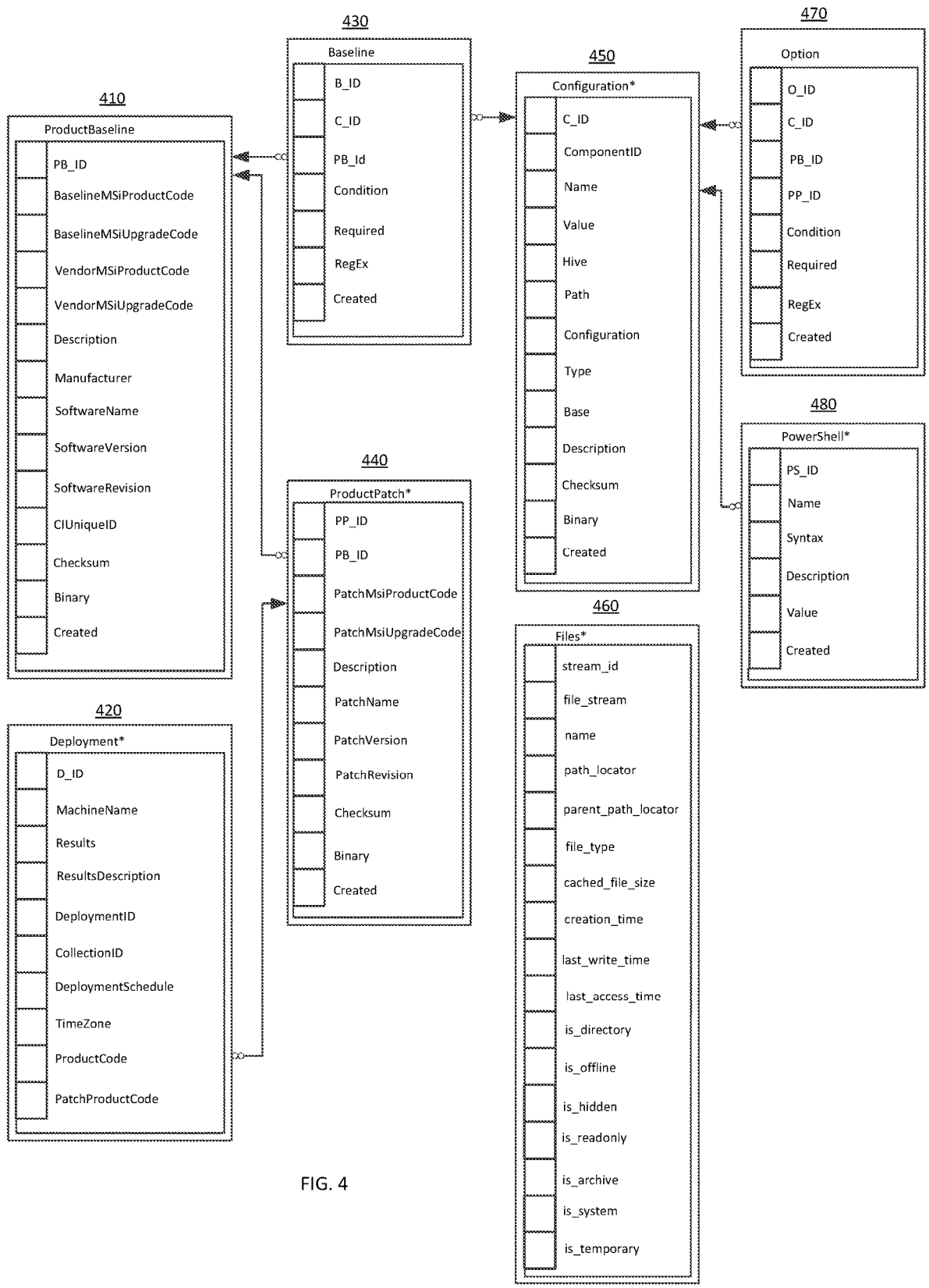
FIG. 4 illustrates a database scheme in accordance with an embodiment of the present invention.

FIG. 4 illustrates a database schema/diagram of data stored in the configuration database 130 in accordance with an embodiment of the present invention. The configuration database 130 may include ProductBaseline objects 410, Deployment objects 420, Baseline objects 430, ProductPatch objects 440, Configuration objects 450, Files objects 460, Option objects 470, and PowerShell objects 480 in accordance with an embodiment of the present invention.

ProductBaseline objects 410 may include unique identifier information, product code, or key file information, such as information for product codes, manufacturer, software name, software information, software version, software revision and the like. Deployment objects 420 may include reporting information, such as machine name, results, results description, deployment ID, collection ID, deployment schedule, time zone information, product codes, patch product codes and the like.

Baseline objects 430 may be linked to ProductBaseline objects 410. Baseline objects 430 may include relationship information, such as condition information, required information, created information and the like. ProductPatch information 440 may be linked to ProductBaseline objects 410 and Deployment objects 420. ProductPatch information 440 may include patch information, such as patch ID, patch produce code, patch upgrade code, description, patch name, patch version, patch revision, checksum, binary and created information and the like.

Configuration objects 450 may be linked to Baseline objects 430. Configuration objects 450 may include registry information such as component ID, name, value, path, configuration, type, base, description, checksum, binary and created information and the like. Option objects 470 may be linked to configuration objects 450. Option objects 470 may include option information such option ID, condition, required and created information and the like. PowerShell objects 480 may be linked to configuration objects 450. PowerShell objects may include enhancement information, such as name, syntax, description, value, created information and the like.

PowerShell objects 480 may also provide enhancements to configuration instructions, such as, for example, providing the ability to introduce enhancement instructions based on conditions and state of the targeted client device. For example, when adding or updating a file on the system, a PowerShell object may be used to first validate the operation by containing instructions to check that the file to be added or updated does not already exist or is not currently in use prior to the execution of the configuration instructions. In another example for the situation of upgrading an application to a newer version, a PowerShell object may perform pre-upgrade tests such as verification of certain conditions, absence of errors, and other requirements prior to the execution of the configuration instructions. In another example for the situation of upgrading a SQL database record that is inaccessible as part of the filesystem, registry, service, etc., a PowerShell object may provide access to that SQL database record to perform the configuration instructions.

Files object 460 may include configuration file information, such as stream ID, file stream, name, patch locator, parent patch locator, file type, cached file size, creation time, last write time, last access time, and directory, offline, hidden, read-only, archive, system, and temporary information and the like.

Figure 5:
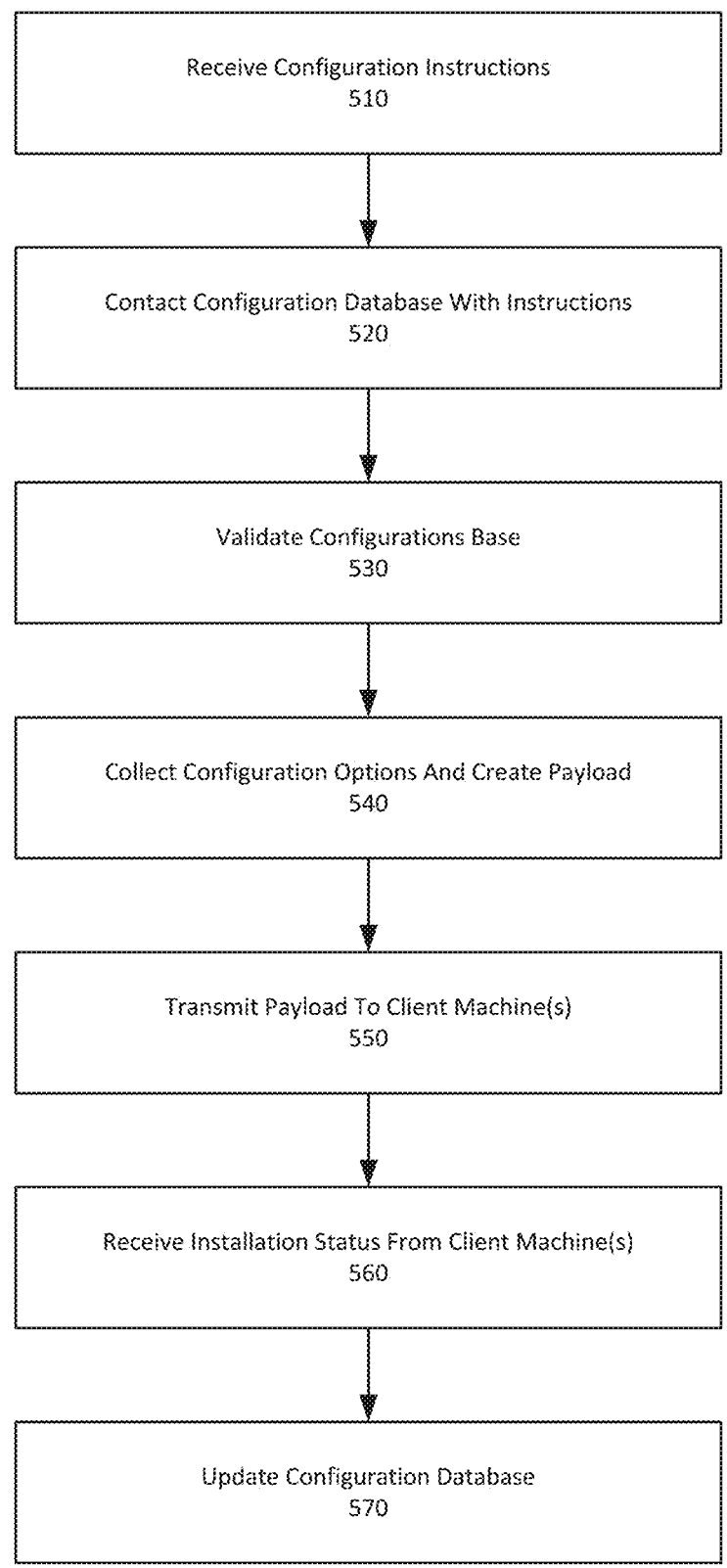
FIG. 5 is a flow diagram illustrating a method for creating a configuration payload in accordance with an embodiment of the present invention.

FIG. 5 illustrates a flow diagram of a method 500 to create a configuration payload for an application according to an embodiment of the present invention. In step 510, configuration instructions may be received. For example, the configuration server 140 of FIG. 1 may receive configuration instructions from a user by way of the service portal. The configuration instructions, for example, may include changes to configuration options.

In step 520, the configuration server 140 may contact the configuration database 130 with the instructions. In step 530, based on the instructions, the configuration database 130 may validate a configuration base. In step 540, the configuration database 130 may collect configuration options indicated in the instructions. After collecting the configuration options, the configuration database 130 may create a payload of the collected configuration options. The payload, for example, may be in the form of an executable for deploying configuration installable to different deployment units.

In step 550, the configuration database 130 may transmit the payload to one or more client machines. The payload (e.g., executable) may apply changes in the configuration of the particular application based on the values assigned to the particular application in the client machine(s). The payload may then deploy the configuration to multiple client machines, each deployment may be specifically configured for the particular client machine. In an embodiment, the payload may gather the configuration items specific to the application and/or client machine, and may download those items (e.g., windows installer), which are then transmitted to the machines. The client machines may then reconstruct an installer database from the received information and may proceed with the installation/update on that machine. In an embodiment, the payload may initiate automatic building of an MSI/MSP locally on the physical machine to perform the installation/update. For example, when a Meridian Framework Application Programming Interface (API) has been implemented, the payload may include a configuration CAB file, which is transmitted to the client machines in step 540, and a Meridian executable that is locally hosted on each of the client machines may use the configuration CAB file to create an MSI package and/or an MSP package for performing the installation/update.

In step 560, the client machine(s) may send installation status to the configuration database. The configuration database may monitor and manage the installation process for errors. In step 570, in the event of an installation error, additional information may also be uploaded to the configuration database such as status messages, install logs, and other system logs. In an embodiment, the system may offer granular rollback capability of applied configurations, allowing roll back to specific previous states. The roll back capability may be implemented using native MSP patching. The configuration database may also store information to track modifications to baseline configurations.

In an embodiment, extensions to launch scripts via DLL extension may be provided. The configuration database may further automatically record events to a log. The configuration database may also automatically log errors. In an embodiment, the errors may be automatically logged without building extra logging functionality into the PS script. In an embodiment, communications may be encrypted for secure modifications.

The use of the configuration system described herein may no longer require going through a full packaging process for each update or modification. Instead, configuration changes may be packaged and implemented through the configuration database and server using the automated service portal. The configuration system and server may maximize bandwidth efficiency by, for example, transmitting only the required configuration change. To conserver more resources, the configuration system may not cache or replicate configuration changes. The configuration framework, however, may cache and create a secondary package source on client devices to manage package source lists. This may ensure that the install source is available for subsequent repairs and uninstalls. The configuration framework may manage the secondary package source on local client machines and may revise package source information during uninstall.

In an embodiment of the present invention, installed configuration changes may be rollbacked to previous configurations without the need of re-installation of the application because prior versions, changes, and history were stored in the configuration database.

Embodiments of the present invention may leverage other installation engines and components such as Windows install engine (e.g., Microsoft Service Installer (MSI) and/or Microsoft Service Patch (MSP)) to apply configuration changes to client devices. Further, embodiments of the present invention may also leverage application management systems, such as System Center Configuration Manager (SCCM) infrastructure for the deployment of configuration changes.

Figure 6:
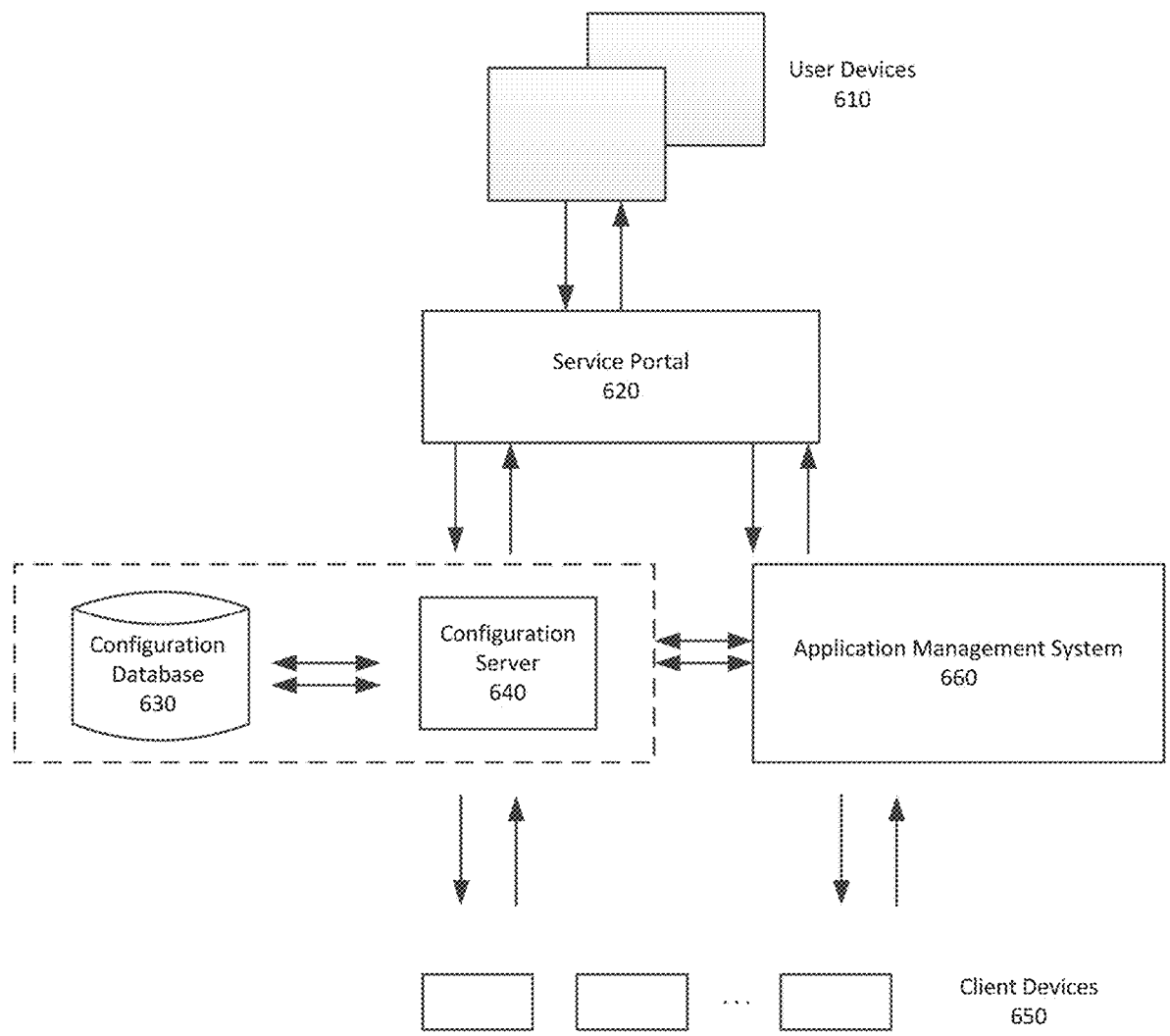
FIG. 6 is a block diagram illustrating an operating environment for operation of a self-service configuration management system in accordance with an embodiment of the present invention.

FIG. 6 is a block diagram illustrating an operating environment for operation of self-service configuration management system operating with an application management system in accordance with an embodiment of the invention. The self-service configuration management system may include a plurality of user devices 610, a service portal 620, a configuration database 630, a configuration server 640, a plurality of client devices 650, and an application management system 660. The user devices 610, the service portal 620, the configuration database 630, the configuration server 640, and the plurality of client devices 650 may operate as described above with reference to FIGS. 1-5.

The application management system 660 may communicate with the service portal 620, configuration database 630 and server 640, and the client devices 650 for the deployment and management of configuration changes. For example, in this embodiment, the service portal 620 may present users of the application management system 660 with configuration information for each application available within the application management system. For example, the configuration options may be tied to the applications of the application management system 660 by way of identification information such as package ID and advertisement ID. Thus, the application management system 660 may deliver bulk core application install, while the configuration database 630 may manage execution of the configuration installs.

The configuration systems and techniques described herein may be applied to software applications, application streams, virtual applications, sandbox applications, and the like. For example, the embodiments of the present invention may be employed to create and deliver an application stream in real-time. The configuration system described herein may be highly extensible. For example, they can be extended, for example, to the OSD Task sequence for delivering dynamic application installs and configurations without having to modify the existing task sequence. Moreover, the configuration techniques described herein are not limited to applications, but the configuration techniques described herein may be used to deliver any configurations, such as operating system configurations.

The embodiments of the present invention, as described, improve computer functionality by making the installation and updating procedures of various applications more efficient and more robust. Further, having a central configuration database may also conserve memory resources as well as provide more functionality.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At minimum, the memory includes at least one set of instructions that are either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A computer may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memories may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communication protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

It should also be readily apparent to one of ordinary skill in the art that the presently disclosed invention may be implemented in a wide range of industries. The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A self-service package configuration management system, comprising:
   a database, stored at a central location, wherein said database stores package configuration items of at least one application that is installed on a plurality of machines;
   a web interface configured to receive, from a user, configuration selections representing changes to the package configuration items of the at least one application; and
   a processor configured to use the received configuration selections to generate a payload configuration CAB file based on the package configuration items of the at least one application and to transmit the configuration CAB file to each of the plurality of machines, the payload configuration CAB file being configured to prompt a payload executable to initiate an automatic building of an installation package for performing an update of the at least one application locally at each of the plurality of machines, wherein the payload executable is transmitted to and is locally hosted on each of the plurality of machines on which the at least one application is installed, and causes each of the plurality of machines on which the at least one application is installed to change the at least one application based at least on content of the payload executable and the package configuration selections such that each respective deployment of the changes is specifically configured for a corresponding one of the plurality of machines, and
   wherein the payload executable is configured to apply a first set of changes to a first machine of the plurality of machines and to apply a second set of changes that is different from the first set of changes to a second machine of the plurality of machines.

2. The system of claim 1, wherein the package configuration items relate to the installation or update functionality of the at least one application.

3. The system of claim 2, wherein the package configuration items includes registry values.

4. The system of claim 2, wherein the package configuration items includes value limits.

5. The system of claim 1, wherein the payload executable is transmitted in an MSI/MSP message.

6. The system of claim 1, further comprising an application management system to manage the payload executable transmission to the plurality of machines.

7. The system of claim 1, wherein the payload executable for a first machine of the plurality of machines is different from the payload executable for a second machine of the plurality of machines, based on prior package configuration settings of the first and second machines.

8. The system of claim 1, wherein the at least one application is an application stream.

9. The system of claim 1, wherein:
   the package configuration items include at least one environmental item that relates to a condition and state of a first machine of the plurality of machines;
   the web interface is further configured to receive, from the user, at least one configuration selection that represents a change to the at least one environmental item with respect to the at least one application; and
   the processor is further configured to automatically generate the payload executable for the first machine based at least in part on the change to the at least one environmental item.

10. The system of claim 1, wherein:
    the package configuration items include at least one file-based item that relates to adding or updating a file on a first machine of the plurality of machines;
    the web interface is further configured to receive, from the user, at least one configuration selection that represents a change to the at least one file-based item with respect to the at least one application; and
    the processor is further configured to automatically generate the payload executable for the first machine based at least in part on the change to the at least one file-based item.

11. A method, comprising:
    storing, at a central location, package configuration items of at least one application installed on a plurality of machines;
    receiving configuration selections for changing the values of the package configuration items from the user via a portal; and
    based on the user selections, using the received configuration selections to generate a payload configuration CAB file based at least on the package configuration items and transmitting the configuration CAB file and a payload executable to each of the plurality of machines on which the at least one application is installed such that the payload executable is locally hosted on each of the plurality of machines, the payload configuration CAB file being configured to prompt the payload executable to initiate an automatic building of an installation package for performing an update of the at least one application locally at each of the plurality of machines,
    wherein said payload executable is configured to deploy the changes for the at least one application on each of the plurality of machines on which the at least one application is installed such that each respective deployment of the changes is specifically configured for a corresponding one of the plurality of machines, and
    wherein the payload executable is configured to apply a first set of changes to a first machine of the plurality of machines and to apply a second set of changes that is different from the first set of changes to a second machine of the plurality of machines.

12. The method of claim 11, wherein the package configuration items relate to the installation or update functionality of the at least one application.

13. The method of claim 12, wherein the package configuration items includes registry values.

14. The method of claim 12, wherein the package configuration items includes value limits.

15. The method of claim 11, further comprising transmitting the payload executable in an MSI/MSP message.

16. The method of claim 11, wherein the payload executable for a first machine of the plurality of machines is different from the payload executable for a second machine of the plurality of machines, based on prior package configuration settings of the first and second machines.

17. A non-transitory computer readable storage medium having stored thereon computer instructions for causing a computer to perform the steps of:
    storing, at a central location, package configuration items of at least one application installed on a plurality of machines;
    receiving configuration selections for changing the values of the package configuration items from the user via a portal; and based on the user selections, using the received configuration selections to generate a payload configuration CAB file and transmitting the configuration CAB file and a payload executable to each of the plurality of machines on which the at least one application is installed such that the payload executable is locally hosted on each of the plurality of machines, the payload configuration CAB file being configured to prompt the payload executable to initiate an automatic building of an installation package for performing an update of the at least one application locally at each of the plurality of machines, to deploy the changes for the at least one application on each of the plurality of machines on which the at least one application is installed such that each respective deployment of the changes is specifically configured for a corresponding one of the plurality of machines, wherein the payload executable is configured to apply a first set of changes to a first machine of the plurality of machines and to apply a second set of changes that is different from the first set of changes to a second machine of the plurality of machines.

18. The non-transitory computer readable storage medium of claim 17, wherein the package configuration items relate to the installation or update functionality of the at least one application.

19. The non-transitory computer readable storage medium of claim 18, wherein the package configuration items includes registry values.

20. The non-transitory computer readable storage medium of claim 18, wherein the package configuration items includes value limits.

21. The non-transitory computer readable storage medium of claim 17, further comprising transmitting the payload executable in an MSI/MSP message.

22. The non-transitory computer readable storage medium of claim 17, wherein the payload executable for a first machine of the plurality of machines is different from the payload executable for a second machine of the plurality of machines, based on prior package configuration settings of the first and second machines.

* * * * *